United States Patent

[11] 3,620,982

| [72] | Inventor | James D. Grossman |
| --- | --- | --- |
| | | Old Bridge, N.J. |
| [21] | Appl. No. | 760,703 |
| [22] | Filed | Sept. 18, 1968 |
| [45] | Patented | Nov. 16, 1971 |
| [73] | Assignee | International Flavors & Fragrances, Inc. |
| | | New York, N.Y. |

[54] PERFUME COMPOSITION CONTAINING DIHYDROISOCARYOPHYLLENE OXIDE
1 Claim, No Drawings

[52] U.S. Cl. .................................................. 252/522, 424/69
[51] Int. Cl. ...................................................... A61p 7/00, C11b 9/00

[50] Field of Search .......................................... 252/522

[56] References Cited
OTHER REFERENCES

Reference cited by applicant, Aebi, J. Chem. Soc. (1953) pp. 3124– 3129

Treibs, Chem. Berichte, Vol. 80 (1947) pp. 56– 63

Guenther, The Essential Oils, Vol. II (1949) D. Van Nostrand Co., N.Y. pp. 99– 106; 716– 717

*Primary Examiner*—Albert T. Meyers
*Assistant Examiner*—Anna P. Fagelson
*Attorney*—Ward, McElhannon, Brooks & Fitzpatrick ABSTRACT: Dihydroisocaryophyllene epoxide and its use in perfume and fragrance compositions, and articles containing same.

PERFUME COMPOSITION CONTAINING DIHYDROISOCARYOPHYLLENE OXIDE

BACKGROUND OF THE INVENTION

Caryophyllene is a naturally occurring material found in oil of cloves, as obtained from the flower-heads of *Eugenia caryophyllata*. It is a sesquiterpene material which is also found in certain species of the genus Pinus. The elucidation of the caryophyllene structure has received attention, and Ramage & Whitehead show the structure of both normal (β-caryophyllene) and isocaryophyllene (γ-caryophyllene) in J. Chem. Soc. Part IV, 4336 et seq. (1954). It is known to obtain epoxides of both the above-mentioned caryophyllenes by treatment of these materials with peracids.

THE INVENTION

Briefly, the present invention provides dihydroisocaryophyllene epoxide (I), also denominated 5,6-epoxy-2,cis 6,10,10-tetramethylbicyclo [7.2.0]-undecane, having the formula:

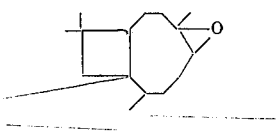

together with processes for preparing this epoxidized material. This invention also contemplates perfume and fragrance compositions comprising the novel dihydro material as well as perfumed articles containing the novel dihydro epoxide I and such perfume and fragrance compositions. The novel epoxide I has a superior woody fragrance note with a very desirable tobaccolike quality. Epoxide I is a homogeneous liquid product which is readily incorporated as superior component of various compositions.

It will be understood from the present description that the novel compound can exist in several isomeric forms depending upon the orientation of substituents on the larger ring, and the foregoing formula comprehends such isomers. Thus, the methyl and hydrogen substituent on the two carbon atoms attached to the epoxy group can both be above or both be below the oxygen atom with respect to the plane of the ring to which they are attached, and the 2-methyl group can similarly be oriented above or below the ring.

The starting material for use in the present invention can be either caryophyllene (II) having the formula:

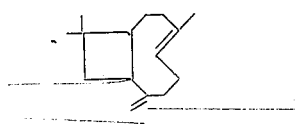

or isocaryophyllene (III) having the formula:

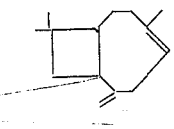

When the starting material is caryophyllene, it is first converted to isocaryophyllene by well known methods, such as photochemically by the method of Schulte-Elte et al., Helv. Chem. Acta., Vol. 51, Fasc. 3, pp. 494–505 (1968) or by treatment with nitrous acid. It is preferred that the isocaryophyllene utilized in the present invention be refined to a purity of at least 90 percent to minimize the formation of undersired by-products which complicate recovery and reduce the odor intensity of finished epoxide I.

According to the present invention, the isocaryophyllene starting material containing little or no caryophyllene is treated with a peracid to form the epoxide. Suitable peracids include aromatic peracids such as perphthalic acid, perbenzoic acid, and the like, as well as aliphatic peracids, especially lower aliphatic peracids such as peracetic acid, perpropionic acid, and the like. It will be understood from the present description that the peracid can be formed in situ by the use of a suitable organic anhydride and concentrated hydrogen peroxide, that is, hydrogen peroxide having a strength of about 30 percent or greater. For instance, acetic anhydride and concentrated hydrogen peroxide can be used in lieu of peracetic acid. All parts, proportions, percentages and ratios herein are by weight, unless otherwise indicated.

The oxidation reaction is preferably carried out in the presence of a buffer material, such as an alkali-metal salt of an organic acid. It is preferred that the organic acid from which the salt is formed be the same as the acid from which the peracid is derived. Thus, when peracetic acid is utilized, sodium, potassium, and like acetates can be used. The reaction medium can optionally contain a vehicle which is inert to the peracid and will not react with the isocaryophyllene.

The oxidation reaction is desirably carried out at low temperatures, i.e., below normal room temperature, to obtain a better yield by minimizing formation of unwanted byproducts. Accordingly, the reaction can be carried out at temperatures of from −25° to 10° C. It has been found preferable to maintain the reaction mixtures at 0°–5° C. After the addition of the peracid is complete, the temperature can be permitted to rise slowly to room temperature to ensure completeness of reaction.

After oxidation the isocaryophyllene epoxide isomers so produced are hydrogenated to add a mole of hydrogen to the oxide molecule. The hydrogenation is carried out under mild conditions which will hydrogenate the methylene group without reducing the epoxide linkage. It is preferred to carry out this hydrogenation with metallic catalysts, especially precious metal catalysts such as palladium, platinum, rhodium, and the like. Raney nickel can also be utilized as the metallic catalyst in preparing epoxide I. The metallic catalyst is desirably incorporated with an inert carrier such as carbon, calcium carbonate, and the like. A preferred catalyst is palladium on calcium carbonate. The amount of catalyst used is from 0.1 to 10 percent of the isocaryophyllene oxide. If desired, the isocaryophyllene epoxide isomers can be separated prior to hydrogenation and one or a combination of the isomers can be used.

The hydrogenation is carried out utilizing a substantially stoichiometric amount of gaseous hydrogen. The use of excessive amounts of hydrogen results in over-hydrogenation of the molecule, and the use of substantially less than stoichiometric amounts leaves large quantities of unreacted isocaryophyllene epoxide which must then be separated from the reaction mixture and reprocessed.

The hydrogenation is carried out at temperatures of from about 25° to about 125° C., and the preferred temperature range is from 30° to 50° C. The use of excessive temperatures over-hydrogenates the epoxide and causes undesirable isomerization, while low temperatures afford a needlessly long reaction time. The time of the reaction is preferably from about 2 to about 8 hours, as this provides the best control of the reaction rate and degree. As in the case of the quantity of hydrogen, the use of the proper temperature conditions will insure good yields of desired epoxide I and prevent the loss of starting material.

The hydrogenation can be carried out at subatmospheric, atmospheric, or superatmospheric conditions. In most instances no advantage is derived in operation at subatmospheric or atmospheric pressures, so that superatmospheric pressures are desirable. It is generally preferred to carry out the hydrogenation at from 100 to 300 p.s.i.g.

The hydrogenation can be carried out on the purified isocaryophyllene epoxide per se, but an inert reaction vehicle is desirably used. The reaction vehicle should be inert to both hydrogen and the isocaryophyllene epoxide under the reaction conditions. Accordingly, suitable reaction vehicles include alcohols such as methanol, ethanol, isopropanol, and the like, ethers such as ethyl ether, and hydrocarbons such as hexane and mineral oil.

After hydrogenation is substantially completed, the reaction product is separated from the catalyst by suitable means such as settling, centrifugation, filtering, and the like. The product can further be purified by extraction, distillation, washing, preparative chromatographic techniques and the like. Fractional distillation is a preferred method of purifying epoxide I.

The novel dihydro epoxide I so produced has a boiling point of 85°–86° C. at 0.2 mm. Hg., a refractive index of 1.4795, and a specific rotation in sodium D light of −4.24° at 20° C. The purified product has an intense, persistent woody odor with a very fine tobaccolike character.

The novel dihydroisocaryophyllene epoxide I is very useful as an olfactory agent and fragrance. This novel material can impart its woody, tobaccolike fragrance note to perfume compositions, fragrance compositions, and perfumed articles according to the present invention. It can be formulated into, or used as a component of, perfume and fragrance compositions.

The term "perfume composition" is used herein to mean a mixture of natural and/or synthetic organic compounds, including, for example, alcohols, aldehydes, ketones, esters and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round off and accompany the main note; (c) fixatives which include odorous substances which lend a particular note to the perfume throughout all stages of evaporation, and substances which retard evaporation; and (d) top-notes which are usually low-boiling fresh-smelling materials.

In perfume compositions the individual component will contribute its particular olfactory characteristics, but the overall effect of the perfume composition will be the sum of the effect of each ingredient. Thus, the epoxide of this invention can be used to alter the aroma characteristics of a perfume composition, for example, by highlighting or moderating the olfactory reaction contributed by another ingredient in the composition.

The amount of the epoxide of this invention which will be effective in perfume compositions depends on many factors, including the other ingredients, their amounts and the effects which are desired. It has been found that perfume compositions containing as little as 2 percent by weight of mixtures or compounds of this invention, or even less, may be used to impart a fine woody odor to soaps, cosmetics and other products. The amount employed can range up to 10 percent or higher and will depend on considerations of cost, nature of the end product, the effect desired on the finished product and the particular fragrance sought.

The epoxides described herein can be used alone or in a perfume composition as olfactory components in detergents and soaps; space odorants; perfumes; colognes; bath preparations such as bath oil, bath salts; hair preparations such as lacquers, brilliantines, pomades, and shampoos; cosmetic preparations such as creams, deodorants, hand lotions, sun screens; powders such as talcs, dusting powders, face powder; and the like. When used as an olfactory component of a perfumed article, as little as 0.011 percent of the novel epoxide will suffice to impart a woody, tobaccolike odor character.

It will be understood from the present description that the dihydro epoxide isomer mixture mentioned above can be resolved into its components and that these components are also useful in perfumery.

In addition, the perfume composition can contain a vehicle or carrier for other ingredients. The vehicle can be liquid such as alcohol, glycol, or the like. The carrier can be an absorbent or adsorbent solid such as a gum or components for encapsulating the composition. The examples which appear hereinbelow illustrate perfume mixtures, soaps and other formulations within the scope of this invention.

The following examples are given to illustrate embodiments of the invention as it is presently preferred to practice it. It will be understood that these examples are illustrative, and the invention is not to be considered as restricted thereto except as indicated in the appended claims.

EXAMPLE I

PREPARATION OF NOVEL EPOXIDE

Isocaryophyllene is prepared from caryophyllene by treatment of the latter with nitrous acid, as shown in Annalen, 1907, 356, 1. Into a 12-liter flask equipped with a stirrer, thermometer, condenser, and dropping funnel are charged 2,250 g. of such isocaryophyllene and 298 g. of anhydrous sodium acetate, and the contents of the flask are cooled to 0° C. with a dry ice bath. Forty percent peracetic acid (2,182 g.) is added to the flask very slowly with rapid stirring. The reaction is strongly exothermic, and the rate of addition is controlled to maintain the temperature at from 0° to 5° C. A 2.5-hour time is necessary for the peracetic acid addition, after which the flask contents are maintained at 0°–5° C. for 3 hours, during which interval the course of the reaction is monitored via gas/liquid phase chromatography (GLC) to 90 percent of completion.

At the end of this interval, the flask contents are poured into five liters of water, and one liter of toluene is added to aid in the separation. The toluene extract so obtained is washed with a saturated aqueous sodium chloride solution, then with sodium bicarbonate until alkaline, and finally with saturated aqueous sodium chloride; dried over magnesium sulfate, and filtered, and the toluene is removed by evaporation.

The isocaryophyllene epoxide is flash-distilled and then redistilled at 128°–205° C. and 0.2 mm. Hg. Prior to the distillation, 100 g. of "Primol" mineral oil, 20 g. of triethanolamine, and 5 g. of "Ionol" 2,6-di-t-butyl-p-cresol antioxidant are added.

The purified isocaryophyllene epoxide so obtained in the amount of 1,816 g. (6.64 mol) is then placed into a hydrogenation bomb, and 500 g. of isopropyl alcohol and 25 g. of 5 percent palladium on calcium carbonate catalyst are added. Hydrogen is introduced in stoichiometric amount at a pressure of 250 p.s.i.g. and a temperature from 33° up to 47° C. over an interval of 4.5 hours. The hydrogenated material so produced is filtered, combined with 100 g. of "Primol" mineral oil, 20 g. of triethanolamine and 5 g. of "Ionol" antioxidant, and distilled at 128°–205° C. and 0.2 mm. Hg to obtain about 1,364 g. if dihydroisocaryophyllene epoxide I.

This material has an excellent woody, tobaccolike fragrance, and the boiling point, refractive index, and density as indicated above.

EXAMPLE II

PERFUME COMPOSITION

A perfume composition is prepared with the following ingredients:

| Ingredient | Parts |
| --- | --- |
| Vetivert Oil | 40 |
| Epoxide of example I | 85 |
| Sandalwood Oil | 100 |
| Rose Geranium Oil | 200 |
| Musk Ambrette | 25 |
| Benzyl-iso-Eugenol | 100 |
| Coumarin | 100 |
| Heliotropin | 50 |
| Bois de Rose Oil | 200 |

| | |
|---|---|
| Benzoin Resin | 100 |
| Total | 1,000 |

The perfume composition exhibits an exceptional tobacco-woody fragrance character. When the dihydro oxide is omitted, the composition lacks this novel quality.

In comparison with caryophyllene epoxide and dihydrocarophyllene epoxide, the novel dihydro epoxide I is surprisingly found to have a much stronger, richer and more persistent woody plus the tobaccolike odor which renders it highly useful in the preparation of fragrances and perfumes. In fact, these other two caryophyllene derivatives are weak and characterless products.

It will be understood from the present description that epoxide I can be used to provide a rich, woody fragrance character to a broad array of perfumed articles. Several examples of such articles and their preparation follow:

EXAMPLE III

PREPARATION OF SOAP COMPOSITION

One hundred grams of soap chips are mixed with 1 gram of the product of example I until a substantially homogeneous composition is obtained. The perfumed soap composition manifests an excellent woody odor character.

EXAMPLE IV

PREPARATION OF A DETERGENT COMPOSITION

A total of 100 grams of a detergent powder is mixed with 0.15 gram of the product of example I until a substantially homogeneous composition is obtained. This composition has an excellent woody odor.

EXAMPLE V

PREPARATION OF A COSMETIC POWDER COMPOSITION

A cosmetic powder is prepared by mixing in a ball mill 100 grams of talcum powder with 0.25 gram of the product obtained from the process of example I. It has an excellent woody odor.

EXAMPLE VI

PERFUMED LIQUID DETERGENT

Concentrated liquid detergents with a rich woody odor are prepared containing 0.10 percent, 0.15 percent, and 0.20 percent of the oxide of this invention. They are prepared by adding and homogeneously mixing the appropriate quantity of epoxide I in the liquid detergent. The detergents all possess a woody fragrance, the intensity increasing with greater concentration of the epoxide of this invention.

What is claimed is:

1. A perfume composition consisting essentially of an effective amount of dihydroisocaryophyllene oxide having a woody tobaccolike odor and an auxiliary perfume carrier or vehicle.

* * * * *